United States Patent [19]
Lentz

[11] 3,931,638
[45] Jan. 6, 1976

[54] APPARATUS FOR MODIFYING THE TIME BASE OF SIGNALS

[75] Inventor: Robert A. Lentz; James U. Lemke, both of Del Mar, Calif.

[73] Assignees: Eastman Technology, Inc., Rochester, N.Y.

[22] Filed: Jan. 10, 1974

[21] Appl. No.: 432,363

[52] U.S. Cl............. 360/36; 178/69.5 TV; 360/37
[51] Int. Cl.². ......................................... H04N 5/79
[58] Field of Search................... 360/26, 36, 51; 178/69.5 DC, 69.5 TV, 69.5 F, 5.4 LD; 328/37; 307/221 R, 221 C, 221 D, 238; 340/173 R, 173 S, 172.5; 179/15 BS; 207/293, 304; 358/4, 8

[56] References Cited
UNITED STATES PATENTS

| | | | |
|---|---|---|---|
| 3,080,487 | 3/1963 | Mellott et al. | 360/26 |
| 3,197,739 | 7/1965 | Newman | 360/26 |
| 3,210,464 | 10/1965 | Farnholz | 360/36 |
| 3,564,434 | 2/1971 | Camenzind et al. | 329/122 |
| 3,580,991 | 5/1971 | Krause | 360/36 |
| 3,666,880 | 5/1972 | Krause | 178/69.5 DC |
| 3,749,837 | 7/1973 | Doughty | 360/36 |
| 3,758,710 | 9/1973 | Crosno | 178/69.5 DC |
| 3,761,646 | 9/1973 | Beaviala | 360/26 |
| 3,860,952 | 1/1975 | Tallent et al. | 360/36 |

OTHER PUBLICATIONS
Sangster et al., Bucket-Brigade Electronics—New Possibilities for Delay, Time Axis Conversion, and Scanning, IEEE Journal of Solid State Physics, Vol. SC-4, No. 3, 6/69, pp. 131-136.

*Primary Examiner*—Raymond F. Cardillo, Jr.
*Attorney, Agent, or Firm*—R. F. Cody

[57] ABSTRACT

Time base instability of signals in a train thereof is corrected by use of analog shift registers. As employed in the correction of time base instability of video signals, paired analog shift registers are used. While one register has samples of one video line signal clocked into it at a rate corresponding to its time base instability, the other register clocks out, at a uniform rate, analog signals of the previous line, and vice versa.

3 Claims, 6 Drawing Figures

APPARATUS FOR MODIFYING THE TIME BASE OF SIGNALS

BACKGROUND OF THE INVENTION

1. Field of the Invention

This invention relates in general to apparatus for modifying the time base of signals in a train thereof; more particularly, the invention is concerned with apparatus for correcting a time base instability in TV type signals.

2. Description Relative to the Prior Art

While the invention is not so restricted, its utility as a flutter compensator in a video tape recorder dramatically indicates its significance. The playback of a taped video recording requires faithful replay of recorded signals without causing such signals to shift unwantedly and continuously in frequency. Unwanted frequency modulation of playback video signals can, among other things, cause (1) the sync information content of the video signal to become unstable, and (2) the color information content of the video to become, at best, faulty, i.e., color information may not be detectable at all, since unstable playback of recorded color burst information within the video signal may cause the color content of the video signal to be lost entirely.

The degree of unwanted frequency shift during playback of the video signal is measured in terms of "percent flutter," it being recognized that even fractional percent flutter will prevent the AFC circuits of most TV's from tracking the fluttering sync signal, resulting in the tearing apart of the visual display that corresponds to the playback signal. Percent flutter may be defined as 100 times a change in frequency divided by a nominal frequency, the nominal frequency in the present case being 15,750 Hz.

To assure against instantaneous time base instability of played back TV signals which are derived from a video tape recorder, present practice is to employ extremely close tolerances in the precision parts of the recorder and to complement such tolerances with various servo controls which actively prevent flutter from occurring during playback. Such practices greatly add to the cost of manufacturing video tape recorders and, indeed, have prevented video recorders from being cost-wise within reach of many who would otherwise want them. This being the case, various proposals have been made to utilize variable delay lines, e.g., U.S. Pat. Nos. 2,960,568; 3,238,300; and 3,580,991, as a way to nullify flutter within playback signals: flutter within the played back signals is detected; the "flutter" signal is then used to vary the delay of a delay line through which the fluttering signal is passed, thereby causing the output of the delay line to be, hopefully, a flutter-free equivalent of the fluttering input to the delay line.

SUMMARY OF THE INVENTION

The invention is a departure from the above-noted delay line concept, having, at the heart thereof, an analog shift register. Basically, the invention teaches (1) the clocking (sampling) of a fluttering signal into an analog register at a rate dependent on the degree of flutter, and (2) the clocking of such signal samples out of such analog shift register at a desired rate. If the desired rate is constant, flutter is nullified. On the other hand, the clock-out rate may be a variable, whereby the signal output of the analog shift register may be modified according to choice.

In utilizing the invention to process signals such as TV type signals, i.e., signals which are continuous and which have a nominal periodicity, the invention further proposes the use of plural analog shift registers, say two, which so cooperate that while one TV line signal is clocked into one register at a flutter-dependent rate, the signal within the other register is clocked out of such register at a known, but stable, rate, and vice versa. The use of a plurality of analog shift registers in the practice of the invention is indicated whenever, in a train of signals, a later occurring signal is to be processed through an analog shift register before an earlier occurring signal has been fully clocked out of the shift register.

OBJECTIVES OF THE INVENTION

To provide apparatus for modifying the time base of signals.

To provide a technique for stabilizing the time base of signals in a train thereof and, more particularly, to provide a technique for stabilizing the time base of signals which continuously occur and have a nominal periodicity.

To provide apparatus for nullifying the effects of flutter during the playback of recorded video information.

The invention will be described with reference to the figures, wherein.

Figure 3:
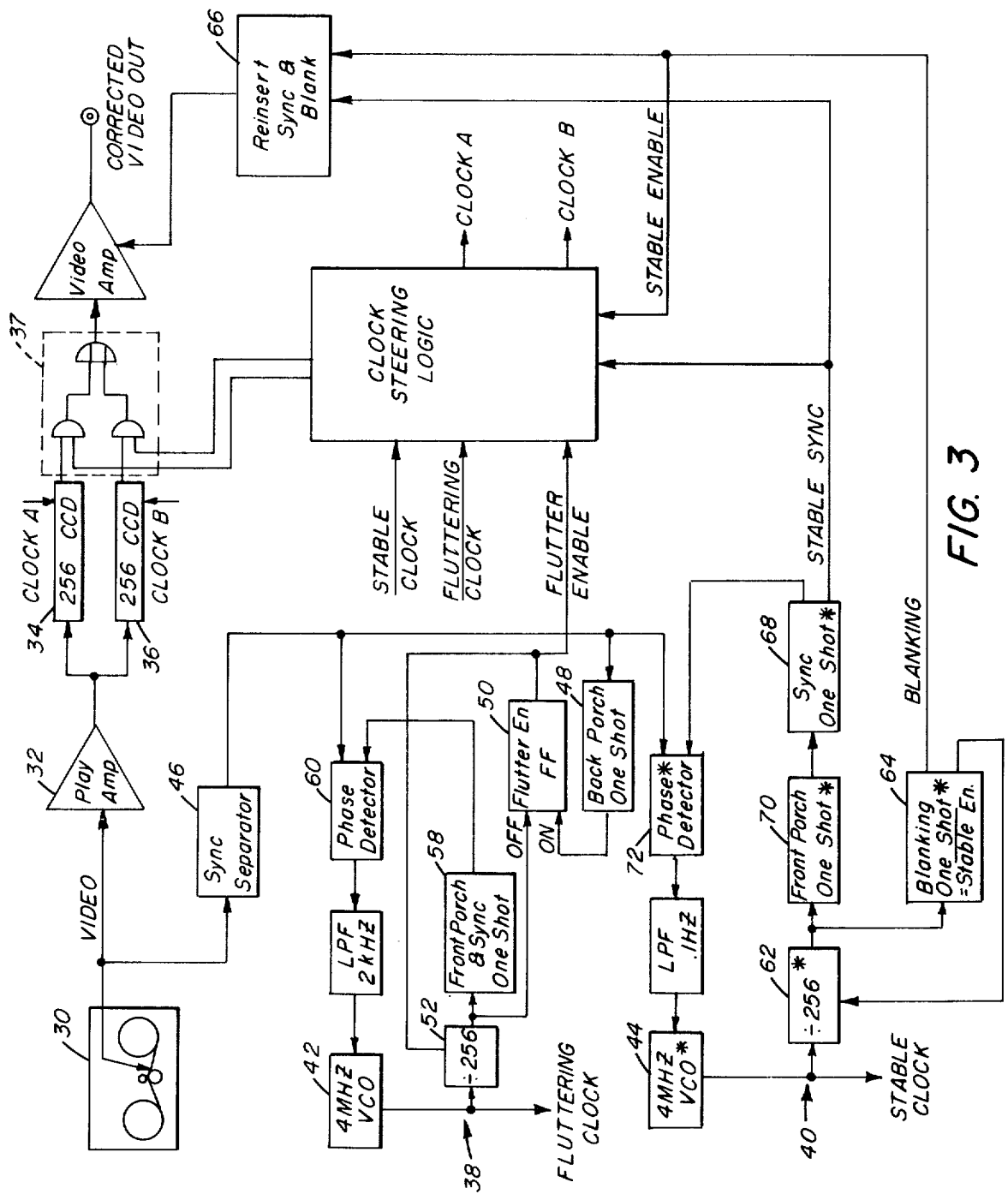
Figure 4:
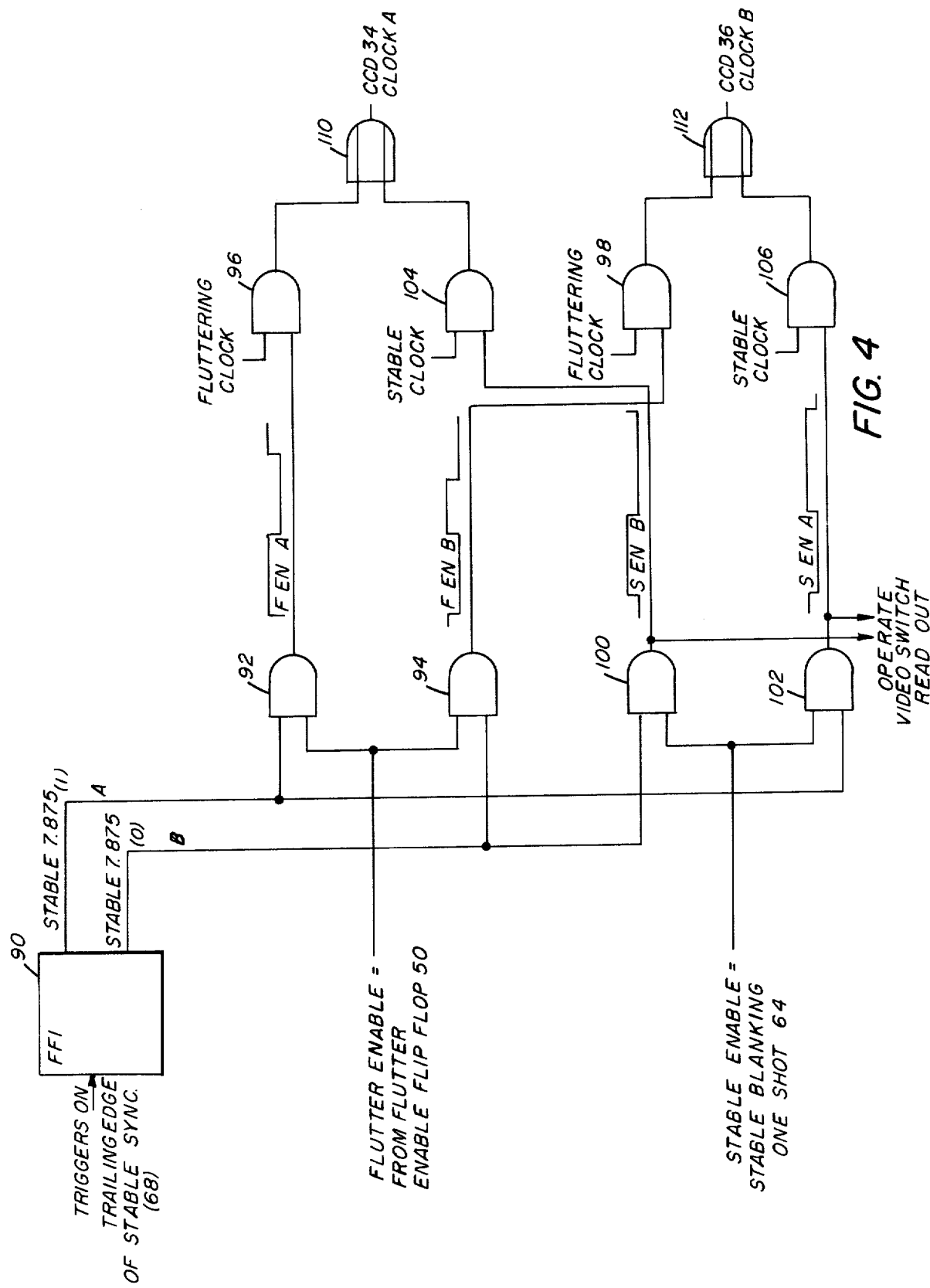
Figure 5:
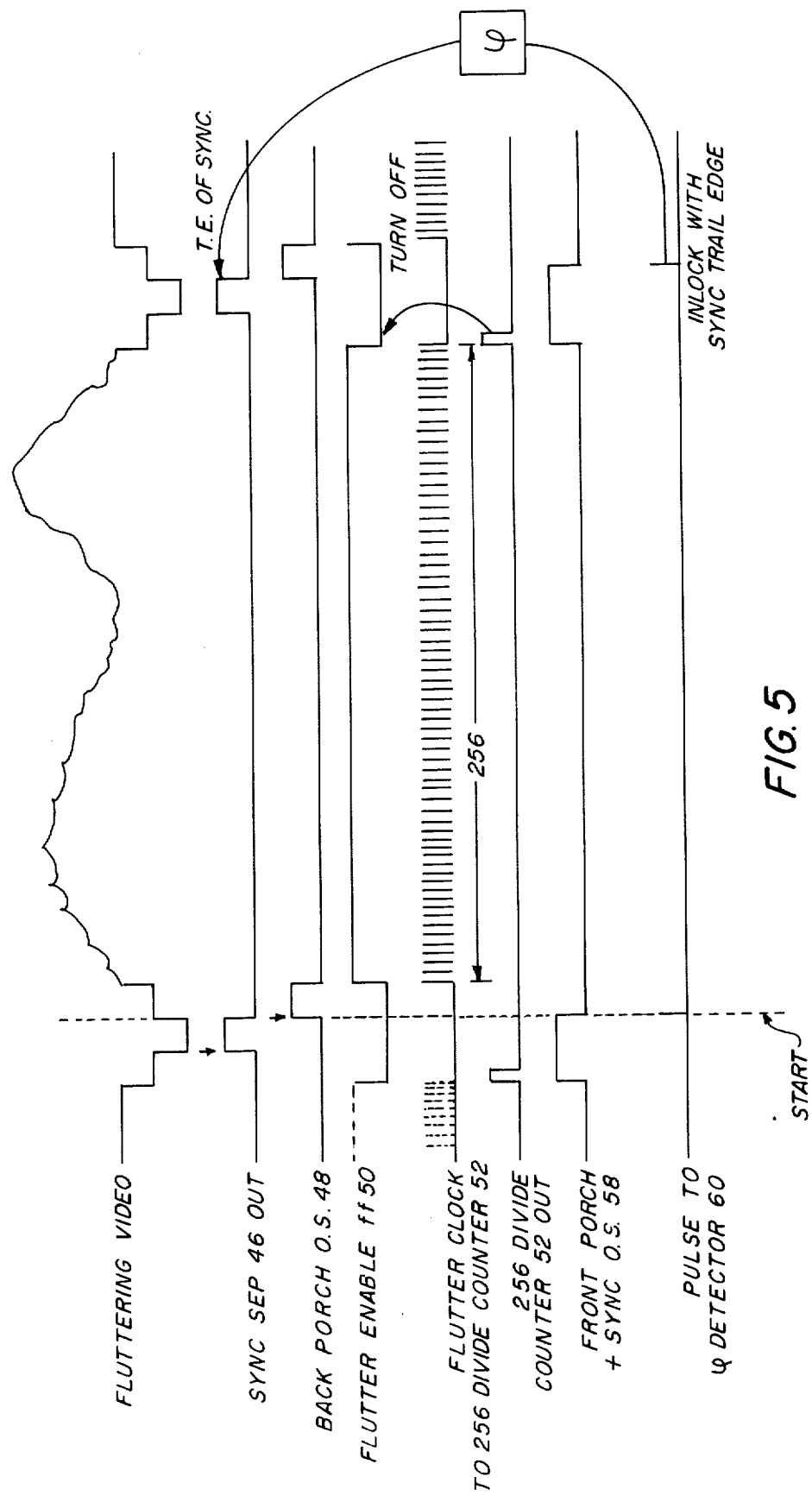
Figure 6:
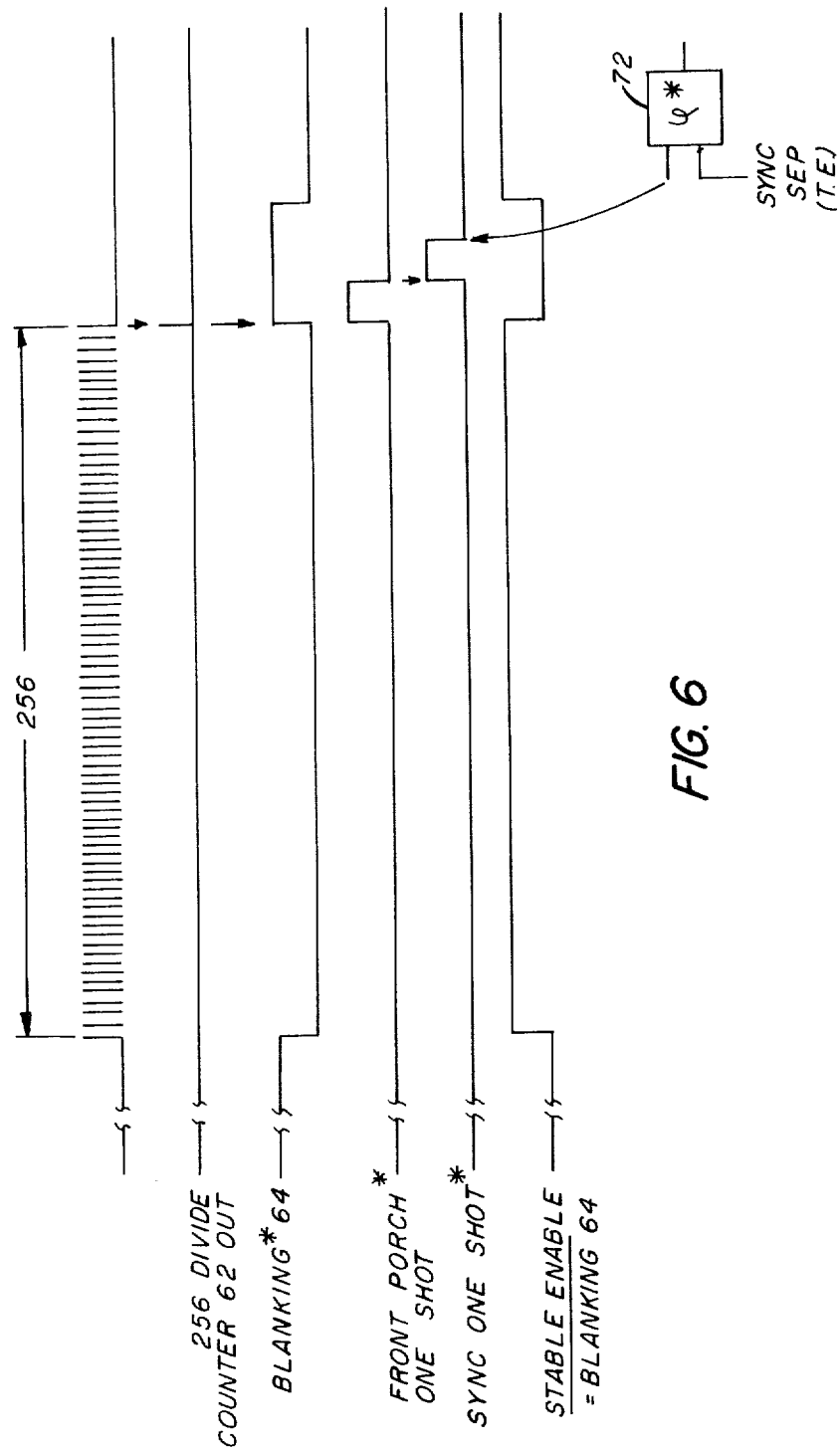

FIG. 3 and 4 together depict a presently preferred implementation of the invention for use in nullifying the effects of playback tape flutter; and FIGS. 5 and 6 are timing diagrams useful in describing the apparatus of FIGS. 3 and 4.

Figure 1:
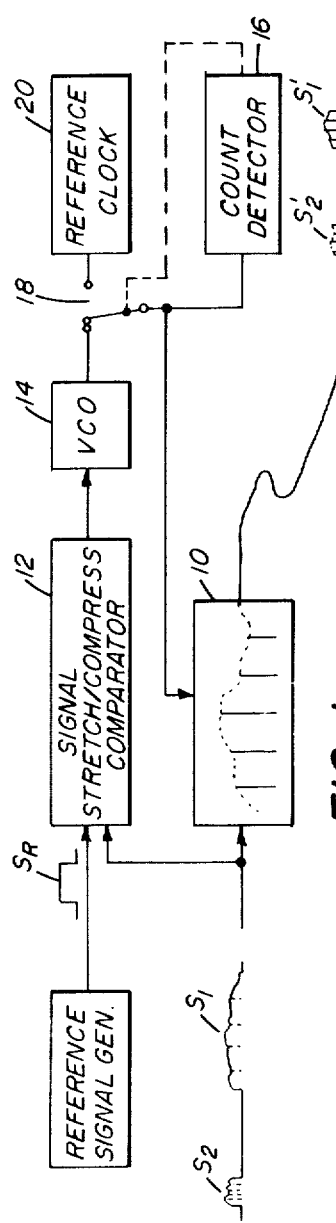
FIG. 1 is a block diagram illustrating one embodiment of the invention.

Referring now to FIG. 1, which shows successive signals $S_1$ and $S_2$ being applied to an analog shift register 10, the signal $S_1$ being stretched with respect to a reference duration $S_R$ and the signal $S_2$ being compressed with respect to the reference duration $S_R$. Analog shift registers may take a variety of forms such, for example, as charge coupled and charge injection devices, various serially disposed sample-and-hold circuits, and even A/D and D/A converters which functionally sandwich digital shift registers. The analog shift register 10 successively samples its applied signal, shifting all contained samples one register stage for each such sampling. To facilitate understanding of the invention, the analog shift register 10 is depicted as having five stages (although in reality it will be usual to employ many more register stages), and each signal $S_1$, $S_2$ is, as indicated, sampled five times.

The time base instability of the signal $S_1$ is determined, in this embodiment, by comparing (comparator 12) its duration with the duration of the reference signal $S_R$. Determining that the signal $S_1$ is stretched, the comparator 12 thereafter signals a voltage control oscillator 14 to sample the signal $S_1$ at a relatively slow rate. Thus, despite the fact that the signal $S_1$ is relatively extensive, it is sampled the same number of times yet more slowly than a signal of normal duration would be sampled. After (in the simplified case at hand) five samples have been taken, the analog shift register 10 is fully loaded. A count detector 16, receiving the oscillator 14 output, keeps track of the number of samples in the register 10 and, as soon as the register 10 is loaded, the detector switches (18) the clocking of the register 10 to the control of a reference clock 20. Then the reference clock 20 clocks the register contents out and, in doing so, causes the signal $S_1$ to assume $(S'_1)$ the time base of the reference $S_R$. As the signal $S'_1$ is clocked out of the register 10, the count detector 16 keeps track of the disgorging and, as soon as the register 10 has been emptied, the count detector again switches to ready the register 10 for the compressed signal $S_2$.

The signal $S_2$, since it has a duration less than the reference duration, causes the comparator 12 to signal the voltage control oscillator 14 to run at a higher frequency than its nominal frequency. Again the register 10 loads up (relatively quickly); and again the count detector 16 causes the reference clock 20 to unload the register at the nominal rate, thereby causing the signal $S_2$, like the signal $S_1$, to assume the time base of the reference $S_R$.

The signals $S_1$ and $S_2$ are depicted as being comprised of amplitude variable pulses, but obviously conventional smoothing devices, if necessary or desired, may be employed to provide the envelopes of such signals.

Implicit in the operation of apparatus according to FIG. 1 is the requirement that the signal $S_2$ occur sufficiently after the signal $S_1$ as to enable the signal $S'_1$ to be clocked out of the register 10. In those instances, however, where such requirement cannot assuredly be met, as in the processing, for example, of flutter-influenced TV type signals, the invention takes a configuration similar to that depicted in FIG. 2, the corresponding elements of FIGS. 1 and 2 being similarly numbered, but primed in the case of FIG. 2. (FIG. 2, though limited in certain detail, is presented at this time for tutorial purposes and to facilitate an easy understanding of the workings of the apparatus depicted in FIGS. 3 and 4.)

Figure 2:
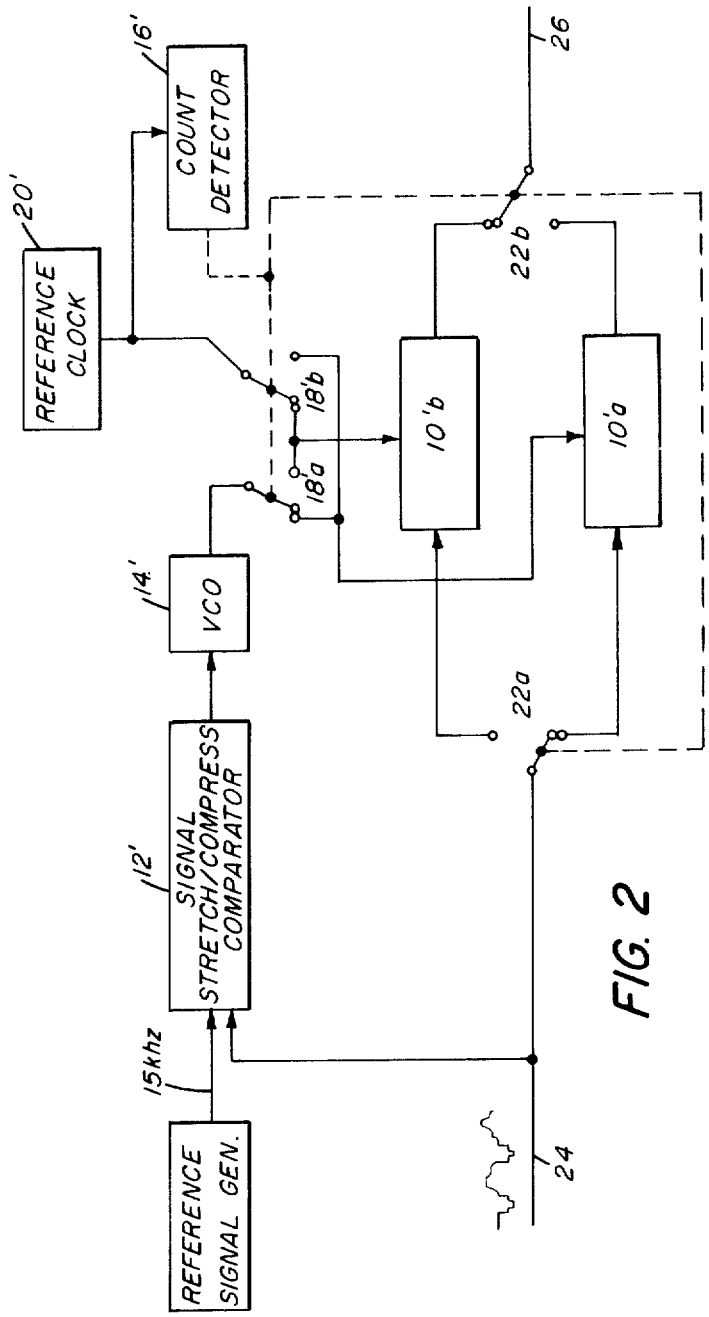
FIG. 2 is a block diagram illustrating the basic philosophy of another embodiment of the invention, and depicting in relatively broad terms the invention as described in relation to FIGS. 3 through 6.

Assuming that a train of flutter-influenced TV signals appears on line 24 of FIG. 2, the time-wise stretch or compression of the duration between successive sync pulses in the train is determined by comparing (12') a reference sync rate with the instantaneous fluttering sync rate. Attendantly, in inverse relationship to the output of the comparator 12', a voltage controlled oscillator 14' clocks, first, a predetermined number of samples taken from one fluttering line of the TV signal train into a first analog shift register 10'; then, as soon as the shift register $10'_a$ is loaded — and in response to a count detector 16' which actuates ganged switches $18'_{a,b}$ and $22_{a,b}$ — a like number of samples, taken from the next fluttering line in the TV signal train, is clocked into a second analog shift register $10'_b$. During the clocking of signal samples into the register $10'_b$, the register $10'_a$ unloads under control of a reference clock 20'. And then, while the register $10'_b$ is, in turn, unloaded under control of the reference clock 20'. the third fluttering TV line is clocked into the register $10'_a$ under control of the voltage control oscillator 14', and so on, whereby fluttering TV signals appearing on line 24 of FIG. 2 are converted to flutter-free signals appearing on line 26.

Turning now to FIGS. 3 through 6, a presently preferred embodiment of the invention will be described. Key to the operation of the apparatus of FIGS. 3 and 4, however, is the fact that the sync portions of the TV signal train, despite the fact that they in particular determine the instantaneous fluttering clock rate, are not sampled and clocked into analog shift registers. Rather, shift registers process only the video portions of the TV signal train, and do not handle the sync portions of such signal train.

A fluttering train of TV signals, as might be produced by a video tape recorder 30 during playback, is applied via an amplifier 32 to a parallel pair of analog shift registers 34, 36, each of which is preferably a charged coupled device (CCD) having, say, 256 stages. (The use of a 256-stage CCD is an expedient. Discernible horizontal resolution of a TV image at normal viewing distance is, at best, about 400 elements per each 52 microsecond horizontal line. Since 256-stage CCD's are available for the digital arts ($256 = 2^8$) they were tried, and found to be satisfactory for the intended purpose, and did not noticeably affect the bandwidth of the signals that they processed.)

Two clocks, viz, a fluttering clock and a stable clock, are produced, respectively, by high and low bandwidth phase lock loops 38, 40 which each regulate respective voltage control oscillators 42, 44 having nominal frequencies of 4 Mhz. ($15750 \times 256 \approx 4$ Mhz.). Each phase lock loop 38, 40 is phase locked to the fluttering sync (46), the former being disposed to track relatively short-term flutter corresponding to frequencies up to 2 Khz., and the latter being disposed to track only very long-term flutter corresponding to very low frequencies up to 0.1 Hz.

Reference should now be had to FIG. 5, as well as to FIG. 3: Keeping in mind the above note that sync information is not clocked into the CCD's 34, 36, the fluttering sync is used (back porch one shot 48, and flutter enable flip-flop 50) to define the start of the fluttering video information which is to be sampled at a fluttering rate and clocked into a CCD. The flutter enable flip-flop 50 is turned off — thereby defining the end of the fluttering video which has been clocked into a CCD — as soon as, and each time, a 256 count-down divider 52 registers an output.

To complete the description of the timing of the fluttering clock, a front porch one shot 58, triggered simultaneously with the turning off of the flutter enable flip-flop 50, defines the duration of the combined front porch and sync, and thus provides a reference pulse which may be compared phase-wise (60) with the trailing edge of the fluttering sync to control the frequency of the fluttering clock.

In a somewhat similar way (see FIG. 6), the stable clock which is produced by the voltage control oscillator 44 is divided down (62) to define stable blanking (64), and sync and front porch (68, 70), signals which are to be reinserted (66) into flutter-free outputs from the CCD's 34, 36.

The trailing edge of the reinserted sync, as noted above, is phase compared (72), in a long time constant phase lock loop, to the trailing edge of the fluttering sync signal.

Now keeping in mind the functional showing of FIG. 2, and referring in particular to FIG. 4, the way in which signal samples are clocked into one CCD at a fluttering rate while previously occurring signal samples are clocked out of a second CCD at a uniform rate, and vice versa, will now be described: A flip-flop 90, responsive to the stable sync, provides the overall switching control which (1) sends fluttering and stable clock signals alternately to the CCD's 34, 36, and (2) selects (switch 37) the CCD from which the flutter-free signal is to be clocked out. (No equivalent of the FIG. 2 switch 22a is here necessary, the fluttering signal which is to be stored in one CCD being also clocked into the other CCD during the stable clocking out of such other CCD. During the next "flutter" clocking of such other CCD, however, the contents of that CCD are routinely discarded.)

AND gates 92, 94, responsive to the flutter enable flip-flop 50, alternately steer the fluttering clock, via AND gates 96, 98, to the CCD's 34, 36. Similarly, AND gates 100, 102 respond to the stable enable flip-flop 64 and steer, alternately, the stable clock, via AND gates 104, 106 to the CCD's 34, 36. Thus, clocks A and B, respectively, appearing at the outputs of OR gates 110, 112, are alternately the flutter and stable clocks which are applied to clock signal samples into and out of the CCD's 34 and 36.

The invention has been described in detail with particular reference to preferred embodiments thereof, but it will be understood that variations and modifications can be effected within the spirit and scope of the invention. Although two CCD's are indicated in FIG. 3, it would be within the purview of the invention to employ a larger number of CCD's with, of course, appropriate modification of the switching and clock steering functions.

What is claimed is:

1. Apparatus for removing flutter from a train of TV line-representative signals, comprising:
   a. means for comparing the phase of sync signals in said signal train with reference signals occurring at a normal sync rate, thereby to produce a phase error signal,
   b. means for producing a first clock signal having a predetermined frequency,
   c. means responsive to said phase error signal to produce a second clock signal having a frequency which varies with respect to said predetermined frequency and in proportion to said phase error signal,
   d. first and second analog shift register means for storing a predetermined number of samples of said line-representative signals,
   e. means for alternately applying said first clock signal to said first and second analog shift register means at the line frequency of signals in said train and, simultaneously, applying said second clock signal alternately to said second and first analog shift register means, whereby signal samples are clocked out of one register means at said predetermined frequency while signal samples are clocked into the other register means at a flutter dependent rate,
   f. means for counting the clocks of said first and second clock signals, and
   g. means responsive to sync signals in said train thereof, and to the counts of said first and second clock signals to block all but video information from being processed via said analog shift register means.

2. The apparatus of claim 1, wherein said analog shift register means each have a corresponding number of stages greater than about 200.

3. In combination with a video tape recorder, apparatus for removing flutter from a train of TV line-representative signals played back by said recorder, comprising:
   a. means for comparing the phase of sync signals in said signal train with reference signals occurring at a normal sync rate, thereby to produce a phase error signal,
   b. means for producing a first clock signal having a predetermined frequency,
   c. means responsive to said phase error signal to produce a second clock signal having a frequency which varies with respect to said predetermined frequency and in proportion to said phase error signal,
   d. first and second analog shift register means for storing a predetermined number of samples of said line-representative signals,
   e. means for alternately applying said first clock signal to said first and second analog shift register means at the line frequency of signals in said train and, simultaneously, applying said second clock signal alternately to said second and first analog shift register means, whereby signal samples are clocked out of one register means at said predetermined frequency while signal samples are clocked into the other register means at a flutter dependent rate,
   f. means for counting the clocks of said first and second clock signals, and
   g. means responsive to sync signals in said train thereof, and to the counts of said first and second clock signals to block all but video information from being processed via said analog shift register means.

* * * * *